(12) United States Patent
Uchiyama

(10) Patent No.: US 6,766,108 B2
(45) Date of Patent: Jul. 20, 2004

(54) LENS-FITTED PHOTO FILM UNIT HAVING TRANSPARENT PARTS

(75) Inventor: Keiji Uchiyama, Minami-Ashigara (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 0 days.

(21) Appl. No.: 10/166,121

(22) Filed: Jun. 11, 2002

(65) Prior Publication Data

US 2003/0007792 A1 Jan. 9, 2003

(30) Foreign Application Priority Data

Jun. 11, 2001 (JP) ......................................... 2001-175770

(51) Int. Cl.[7] .............................................. G03B 17/02
(52) U.S. Cl. ........................... 396/6; 396/27; 524/449; 525/164; 428/425.8; 526/201
(58) Field of Search ............................... 396/6, 25, 27, 396/535; 524/91, 449; 525/164; 526/201

(56) References Cited

U.S. PATENT DOCUMENTS

| 4,118,440 A | * | 10/1978 | Jin et al. ...................... 525/164 |
| 4,975,727 A | * | 12/1990 | Ohtaka et al. ............... 396/114 |
| 5,118,734 A | * | 6/1992 | Katsumata .................... 524/91 |
| 5,177,515 A | * | 1/1993 | Tsukamoto ................... 396/27 |
| 5,998,554 A | * | 12/1999 | Yokoo .......................... 526/201 |
| 6,059,464 A | * | 5/2000 | Sakurai ........................ 396/413 |
| 6,075,944 A | * | 6/2000 | Balling et al. ................. 396/6 |
| 6,106,952 A | * | 8/2000 | Yamashita et al. ....... 428/425.8 |
| 6,362,269 B1 | * | 3/2002 | Ishihata et al. .............. 524/449 |

FOREIGN PATENT DOCUMENTS

| EP | 0 307 818 A2 | 3/1989 |
| EP | 0 703 252 A2 | 3/1996 |
| EP | 0 791 850 A2 | 8/1997 |
| JP | 1-94802 | * 4/1989 |
| JP | 4-106113 | * 4/1992 |
| JP | A 4-349455 | 12/1992 |
| JP | A 7-104367 | 4/1995 |
| JP | 7-104367 | 4/1995 |

* cited by examiner

Primary Examiner—D. Rutledge
(74) Attorney, Agent, or Firm—Young & Thompson

(57) ABSTRACT

A lens-fitted photo film unit of a waterproof type comprises a unit body covered with a case body and a lid member. A front window and a top window of the case body are made of transparent plastic. The lid member is also made of the transparent plastic. Methacrylate styrene resin is utilized as the transparent plastic, which is used for a taking lens, a viewfinder lens, and an underwater case constituted of the case body and the lid member. This transparent plastic is hardly clouded even if cosmetics of suntan lotion and so forth adhere thereto. Moreover, a poisonous gas causing photographic-film fog is prevented from rising so that photographic properties are not damaged.

15 Claims, 3 Drawing Sheets

LENS-FITTED PHOTO FILM UNIT HAVING TRANSPARENT PARTS

BACKGROUND OF THE INVENTION

1. Field of the Invention

The present invention relates to a lens-fitted photo film unit having parts, which are made of transparent plastic and are exposed to the outside.

2. Description of the Related Art

An outer surface of a lens-fitted photo film unit has exposed optical parts of a taking lens, a viewfinder lens, a flash window and so forth, which are made of transparent plastic by means of injection molding. As to the lens-fitted photo film unit of a waterproof type, a unit body thereof is covered with a waterproof case, which is also made of transparent plastic by means of injection molding. The unit body contains not only a photographic film loaded in advance but also a built-in photographing mechanism including a shutter device.

The transparent parts are sometimes touched by a finger when the lens-fitted photo film unit is used and carried. In particular, when the waterproof type is used at the beach, cosmetics of suntan lotion and so forth sometimes adhere to the waterproof case. Some of such cosmetics make the transparent plastic clouded due to a chemical change so that transparency of the plastic is deteriorated, such as described in Japanese Patent Laid-Open Publication No. 7-104367. This harmful effect is improved by using AS (acrylonitrile styrene) resin as the transparent plastic, which is the material of the waterproof case.

The AS resin is superior regarding heat resistance, weather proof, resistance to chemicals, and impact resistance. Moreover, the AS resin has high transparency. In light of this, the AS resin is preferable as the material of the waterproof case and the optical parts exposed to the outside. The AS resin, however, generates a gas damaging photographic properties when surrounding temperature becomes high. In this case, it is confirmed that the "fog" is caused on the photographic film. The lens-fitted photo film unit is soled in a state that this film unit is enclosed in a dampproof gusset envelope. In the case of the waterproof type, the lens-fitted photo film unit is further sealed up in the waterproof case. Due to this, the gas generated from the AS resin under a high-temperature condition is accumulated in the waterproof case and the gusset envelope so that the fog is caused on the photographic film loaded in the lens-fitted photo film unit in advance.

SUMMARY OF THE INVENTION

In view of the foregoing, it is a primary object of the present invention to provide a lens-fitted photo film unit having transparent plastic parts exposed to the outside, in which a material of the transparent plastic parts is improved so as to prevent the parts from becoming clouded when a certain sort of cosmetic adheres thereto.

It is a second object of the present invention to provide a lens-fitted photo film unit having transparent plastic parts exposed to the outside, in which it is prevented that fog is caused on a photographic film due to occurrence of a gas damaging photographic properties.

In order to achieve the above and other objects, the transparent plastic parts exposed to the outside of the lens-fitted photo film unit are formed by means of injection molding on condition that one of methacrylate styrene resin and methacrylate butadiene styrene resin is used. As to the transparent plastic parts, there are a taking lens, a viewfinder lens, a flash window and so forth. Besides these, there is an underwater case employed for the lens-fitted photo film unit of a waterproof type.

According to the present invention, a poisonous gas causing photographic-film fog is prevented from rising, and the transparent parts are hardly clouded even if cosmetics of suntan lotion or the like adhere thereto. Thus, it is possible to easily enjoy taking a picture at a beach, a pool side and so forth.

BRIEF DESCRIPTION OF THE DRAWINGS

The above objects and advantages of the present invention will become apparent from the following detailed description of the preferred embodiments of the invention when read in conjunction with the accompanying drawings, in which.

DETAILED DESCRIPTION OF THE PREFERRED EMBODIMENT(S)

Figure 1:
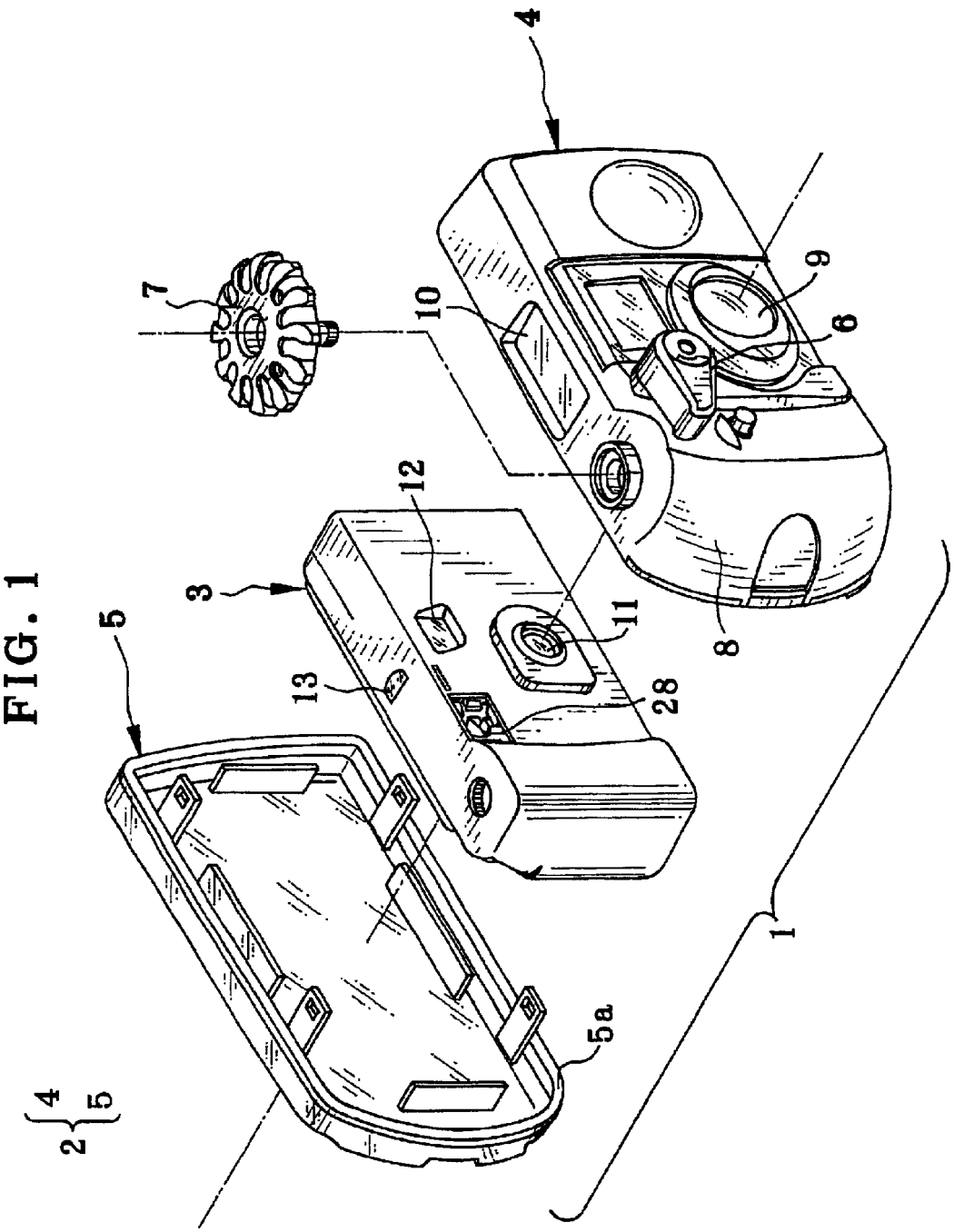
FIG. 1 is an exploded perspective view showing a lens-fitted photo film unit of a waterproof type.

A lens-fitted photo film unit 1 shown in FIG. 1 is constituted of an underwater case 2 and a unit body 3. The underwater case 2 comprises molded parts of plastic and contains the unit body 3 therein. The underwater case 2 includes a case body 4 and a lid member 5. The case body 4 covers the front and the sides of the unit body 3, and the lid member 5 covers the back thereof. The case body 4 is provided with a release lever 6, a take-up wheel 7, and a grip 8. Further, the case body 4 is formed with a front window 9 and a top window 10. The case body 4 is constituted of parts made of opaque plastic, whereas the front window 9 and the top window 10 are made of transparent plastic. The lid member 5 is made of the transparent plastic similarly to the front window 9. A contact portion of the lid member 5 and the case body 4 is provided with rubber packing 5a in order to keep a watertight property.

A front face of the unit body 3 is provided with a taking lens 11 and a viewfinder lens 12, which are exposed and face the front window 9. Moreover, a top face of the unit body 3 is provided with a counter window 13. By a scale of a counter disk 14, a residual photographable number is indicated. The counter window 13 faces the top window 10 so that it is possible to confirm the photographable number from the outside of the underwater case 2.

Figure 2:
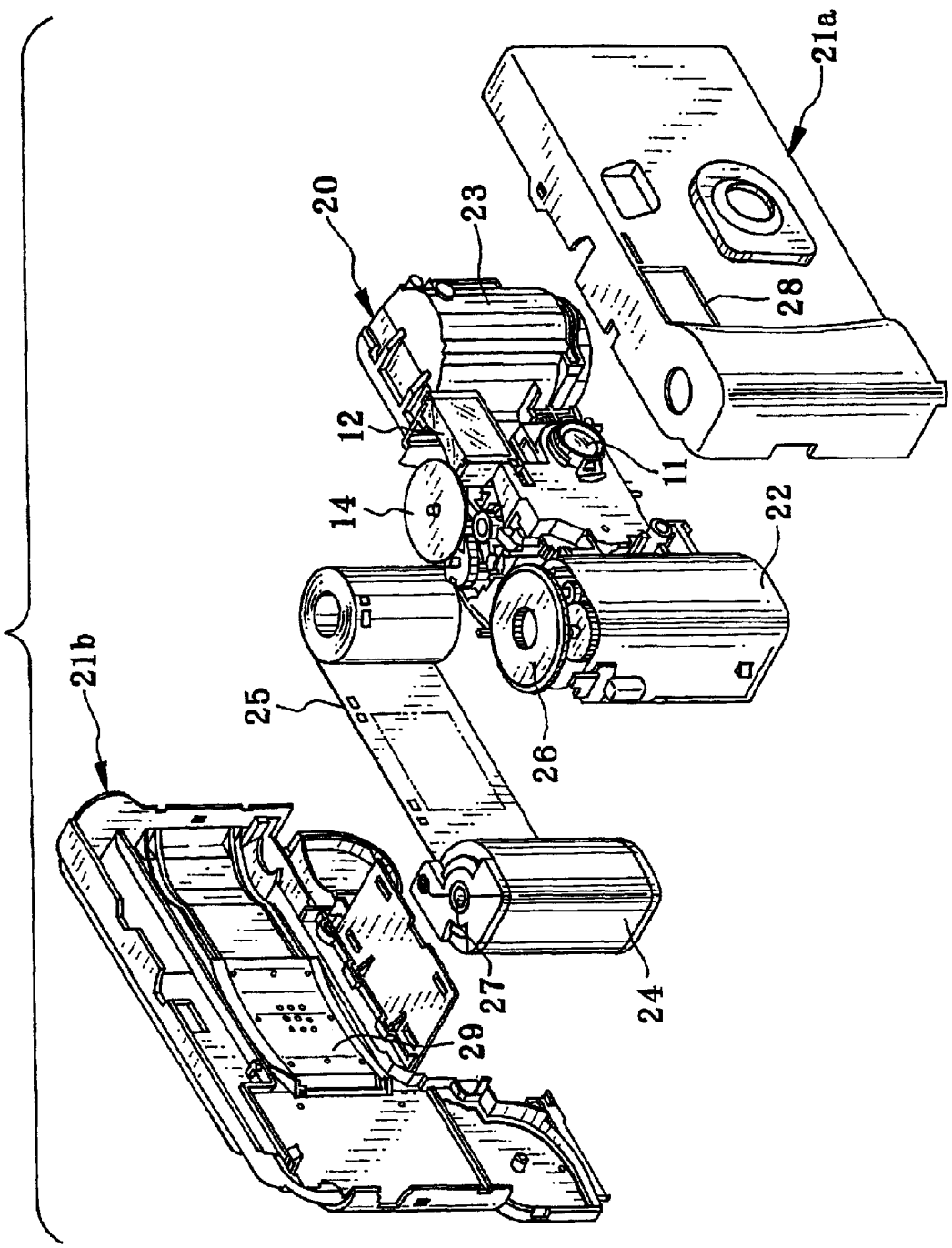
FIG. 2 is an exploded perspective view showing a unit body of the lens-fitted photo film unit.
Figure 3:
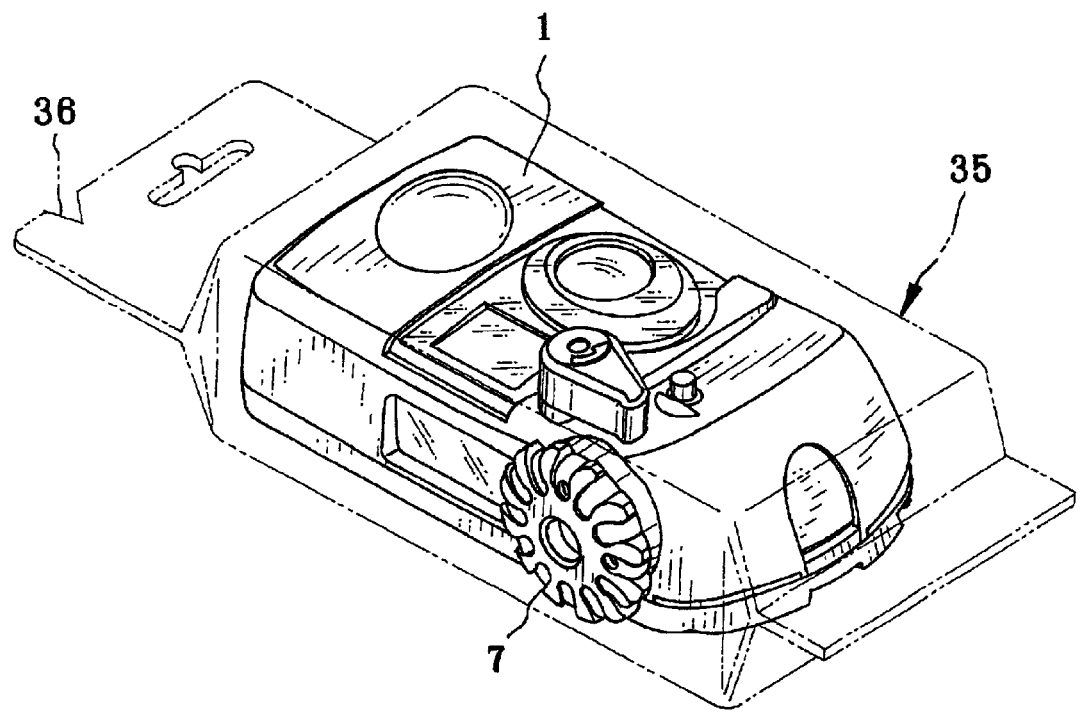
FIG. 3 is a perspective view showing a state in that the lens-fitted photo film unit is enclosed in a gusset envelope.

In FIG. 2, the unit body 3 comprises a body base 20 and a light-shielding covers 21a and 21b, which are constituted of molded parts of black plastic. The body base 20 has a photographing mechanism incorporated therein. The front and the back of the body base 20 are respectively covered with the light-shielding covers 21a and 21b. An upper portion of the body base 20 is provided with a shutter charge mechanism and a film take-up mechanism, which are well known. Further, side portions of the body base 20 are integrally formed with a cartridge chamber 22 and a film chamber 23. A photographic film 25 drawn out of a film cartridge 24 is wound in a roll form and is contained in the film chamber 23. The film cartridge 24 is contained in the cartridge chamber 22. A take-up gear 26 is provided on an upper portion of the cartridge chamber 22, and a lower end of the take-up gear 26 engages with a spool 27 of the film cartridge 24. Further, the take-up gear 26 meshes with an axis of the take-up wheel 7 to rotate the spool 27 in association with a rotational operation of the take-up wheel 7. By rotating the spool 27, the photographic film 25 contained in the film chamber 23 is taken up toward the film cartridge 24, and in accordance therewith, shutter charge is performed.

The light-shielding cover 21a through which the taking lens 11 and the viewfinder lens 12 are exposed is formed with an opening 28. Operational movement of the release lever 6 is transmitted to the shutter charge mechanism via the opening 28. Upon operation of the release lever 6, shutter charge is set free to release a shutter. The right-shielding cover 21b covering the back of the body base 20 covers rear portions of the cartridge chamber 22 and the film chamber 23 so as to shield the photographic film 25 from the light. At the same time, a film guide 29 of the light-shielding cover 21b forms a film passage between both chambers 21 and 23.

As to the transparent plastic used for forming the front window 9, the top window, and the lid member 5, is used methacrylate styrene resin (hereinafter MS resin). The taking lens 11 and the viewfinder lens 12 are also constituted of the molded parts made of the MS resin. The MS resin is non-crystalline thermoplastic resin which is obtained by copolymerization reaction of styrene and methyl methacrylate. The MS resin possesses transparency of acryl plastic and excellent moldability of polystyrene. As the MS resin used for the lens-fitted photo film unit of the waterproof type, there are ESTYRENE (trade name) of Nippon Steel Chemical Co., Ltd., Cevian-MAS (trade name) of Daicel Chemical Industries, Ltd., DENKA TX polymer (trade name) and DENKA PT polymer (trade name) of Denki Kagaku Kogyo K. K., for instance.

When the lens-fitted photo film unit 1 of the waterproof type is sold, this film unit 1 is contained in a gusset envelope 35 and is placed in a store. The gusset envelope 35 is made of a wrapping material which is excellent in a dampproof property and a light-shielding property. The gusset envelope 35 has a structure in that a thin layer of an aluminum film is interposed between polystyrene films. By using this kind of wrapping material, the lens-fitted photo film unit 1 of the waterproof type is kept in a sealed state without receiving the ambient light until usage thereof. When using the lens-fitted photo film unit 1, the gusset envelope 35 is torn from a cut portion 36 so that the lens-fitted photo film unit 1 can be taken out.

Successively, is described an example in that the transparent plastic used for the lens-fitted photo film unit 1 is acrylonitrile styrene resin (hereinafter AS resin). If a product is put under a high-temperature condition during transportation and exhibit, the inside temperature of the gusset envelope rises. Due to this, a poisonous gas to which the photographic film reacts is generated from the transparent parts of the AS resin. The gas generated from an underwater case, a taking lens and a viewfinder lens, which are made of the AS resin, accumulates in the sealed gusset envelope to settle over the inside and the outside of the underwater case. The gas chemically reacts with a photosensitive layer of the photographic film to cause photographic-film fog.

The assignee of the present application performed valuation experiments with regard to deterioration of the photographic properties caused by gas fog, by using the respective transparent plastics and a color photographic film corresponding to ISO sensitivity of 800. In the experiments, the molded parts of the MS resin, the AS resin and conventionally-used polystyrene resin (hereinafter PS resin) were respectively leaved in the gusset envelope together with the photographic film under a predetermined condition. After a period corresponding to one year, the photographic film was developed as it was, and film-base density (optical density in which base density and fog density are added) was measured relative to BGR layers thereof. From a value of the measured film-base density, film-base density of un-experiment photographic film was deducted to calculate a value of the fog density caused by the sealed state containing the molded part of the transparent plastic. Results of the experiment are shown in Table 1. Incidentally, the optical density is represented as D and is obtained by common logarithms of a ratio of a light amount $H_0$ (lx·sec), which is applied to the photographic film, to a transmitted-light amount H (lx·sec) of the photographic film. In other words, the optical density D is obtained by the following formula.

$$D = Log_{10}(H_0/H)$$

[Table 1]
(Increment value of the film-base density under the condition corresponding to progress of one year)

|  | Increment value of the film-base density | | |
| --- | --- | --- | --- |
| Used material | B-layer | G-layer | R-layer |
| MS resin | 0.00 | 0.00 | 0.00 |
| PS resin | 0.00 | 0.00 | 0.00 |
| AS resin | 0.17 | 0.10 | 0.10 |

From the above result, in the case containing the molded part of the AS resin, it has been judged that the increment value of the film-base density is likely to cause discoloration of an image at the time of printing on a photographic paper. Moreover, not only when using the molded part from which an absorption gas is removed by leaving the AS resin in a vacuum chamber, but also when lowering the sealing property of the gusset envelope, it was impossible to prevent the fog density from rising. Thus, it has been concluded that the bad influence (the gas fog) to the photographic film can not be avoided insofar as the AS resin is used for the transparent part.

Meanwhile, the MS resin is synthetic resin excelling in transparency and moldability, and is strong for a reaction to cosmetic chemicals of suntan lotion and so forth. Also, the MS resin is hardly clouded and hardly flaws. Regarding the resistance to the chemicals, the MS resin is slightly inferior to the AS resin. However, in light of the whole of the forgoing results including influence to the photographic film, cost, impact resistance and so forth, the MS resin is a preferable material as the transparent plastic used for camera products.

With respect to the transparent plastic employed in the present invention, it is possible to use methacrylate butadiene styrene resin (MBS resin) as well, which is represented by DENKA TX-100-300L (trade name) of Denki Kagaku Kogyo K. K. for example. It is also possible to use mixed plastic in which the MS resin and styrene butadiene resin are mixed at a predetermined proportion and which has improved toughness. These are the transparent materials excelling in the resistance to chemicals without generating the poisonous gas affecting the photographic film.

Incidentally, the present invention is not exclusive to the waterproof type, but is applicable to the general lens-fitted photo film unit. By using the MS resin for the taking lens, the viewfinder lens and so forth, it is possible to prevent the photographic-film fog and the clouded state of the lens caused by the cosmetics so that photographic properties may be kept.

Although the present invention has been fully described by way of the preferred embodiments thereof with reference to the accompanying drawings, various changes and modifications will be apparent to those having skill in this field. Therefore, unless otherwise these changes and modifications depart from the scope of the present invention, they should be construed as included therein.

What is claimed is:

1. A lens-fitted photo film unit loaded with a photographic film in advance when manufactured, comprising:
   a transparent part exposed to the outside of said lens-fitted photo film unit, said transparent part consisting of methacrylate butadiene styrene resin.

2. A lens-fitted photo film unit according to claim 1, wherein said transparent part is a taking lens for forming an image on said photographic film.

3. A lens-fitted photo film unit according to claim 1, wherein said transparent part is a viewfinder lens used for framing of a subject photographed on said photographic film.

4. A lens-fitted photo film unit loaded with a photographic film in advance when manufactured, comprising:
   a unit body for containing said photographic film; and
   a case for containing said unit body, a transparent portion of said case consisting of methacrylate styrene resin.

5. A lens-fitted photo film unit according to claim 4, wherein said case is an underwater case for containing said unit body in a watertight state.

6. A lens-fitted photo film unit according to claim 5, wherein said underwater case includes a case body for containing said unit body, and a lid member connected to said case body to cover a rear face of said unit body, a part of said case body being said transparent portion and the whole lid member being said transparent portion.

7. A lens-fitted photo film unit according to claim 6, wherein a contact portion of said case body and said lid member is provided with a rubber packing.

8. A lens-fitted photo film unit according to claim 7, wherein said case body is provided with a release lever for actuating a shutter mechanism incorporated in said unit body.

9. A lens-fitted photo film unit according to claim 8, wherein said lens-fitted photo film unit is enclosed in a dampproof gusset envelope.

10. A lens-fitted photo film unit according to claim 4, wherein said case comprises a case body and a lid member connected to said case body so as to contain said unit body, the lid member covering a rear face of said unit body;
    wherein the lid member is the transparent portion.

11. A lens-fitted photo film unit loaded with a photographic film in advance when manufactured, comprising:
    a unit body for containing said photographic film; and
    a case for containing said unit body, the case comprising a transparent portion;
    wherein said case comprises a case body and a lid member connected to said case body so as to contain said unit body, the lid member being the transparent portion and covering a rear face of said unit body;
    wherein an entirety of the lid member consists of methacrylate butadiene styrene resin.

12. A lens-fitted photo film unit loaded with a photographic film in advance when manufactured, comprising:
    a transparent part exposed to the outside of said lens-fitted photo film unit, said transparent part consisting of a mixture of methacrylate styrene resin and styrene butadiene resin.

13. A lens-fitted photo film unit according to claim 12, wherein said transparent part is a taking lens for forming an image on said photographic film.

14. A lens-fitted photo film unit according to claim 12, wherein said transparent part is a viewfinder lens used for framing of a subject photographed on said photographic film.

15. A lens-fitted photo film unit according to claim 12, comprising:
    a unit body containing said photographic film; and
    a case comprising a case body and a lid member connected to said case body so as to contain said unit body, the lid member covering a rear face of said unit body;
    wherein the lid member is the transparent part.

* * * * *